United States Patent
Manninen (10) Patent No.: US 11,507,334 B2
(45) Date of Patent: Nov. 22, 2022

(54) SYSTEM AND METHOD FOR MANAGEMENT OF PRINTING JOBS

(71) Applicant: UPM Raflatac Oy, Tampere (FI)

(72) Inventor: Samuli Manninen, Helsinki (FI)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 17/126,388

(22) Filed: Dec. 18, 2020

(65) Prior Publication Data

US 2021/0200487 A1  Jul. 1, 2021

(30) Foreign Application Priority Data

Dec. 31, 2019 (EP) .................................. 19397534

(51) Int. Cl.
*G06F 3/12* (2006.01)
(52) U.S. Cl.
CPC .......... *G06F 3/1243* (2013.01); *G06F 3/1203* (2013.01); *G06F 3/1238* (2013.01); *G06F 3/1267* (2013.01)
(58) Field of Classification Search
None
See application file for complete search history.

(56) References Cited

U.S. PATENT DOCUMENTS

| | | | |
|---|---|---|---|
| 8,462,371 B1* | 6/2013 | Uhlig .................... | G06F 40/174 358/1.15 |
| 10,839,332 B1* | 11/2020 | McBride ................ | G06K 1/121 |
| 2006/0023238 A1 | 2/2006 | Blaszyk et al. | |
| 2014/0053074 A1* | 2/2014 | Kim ....................... | G06F 16/168 715/738 |

FOREIGN PATENT DOCUMENTS

WO  2018162797 A1  9/2018

* cited by examiner

*Primary Examiner* — Thomas D Lee
(74) *Attorney, Agent, or Firm* — Cantor Colburn LLP (57) ABSTRACT

There is disclosed a method for management of printing jobs. In the method user identification is requested to identify the user, who then selects an artwork for the labels. Data regarding the selected artwork is retrieved from a data storage. Printing properties are defined for the selected artwork, and a set of available unique codes for the labels is determined on the basis of the user identification. A printing file is constructed including information related to at least the selected artwork and printing material selected for the printing job. The printing file is stored into a cloud storage linked with the identified user. A unique code is assigned for each label from the set of available unique codes. The unique code is assigned either in the printing file or when printing the labels.

15 Claims, 6 Drawing Sheets

SYSTEM AND METHOD FOR MANAGEMENT OF PRINTING JOBS

CROSS REFERENCE TO RELATED APPLICATION

This application claims priority to European Application No. 19397534.9, filed Dec. 31, 2019, the contents of which are incorporated by reference in their entirety.

TECHNICAL FIELD

There is provided a system and method for printing labels for physical products.

BACKGROUND

Physical products such as bottles of drinks, packages of fragrancies, packages of tissue papers, sweets and other packaged items have labels designed by manufactures or brand owners of the items. For example, lemonade bottles may have different kinds of labels depending on the manufacturer of the lemonade and the quality of the lemonade so that consumers can more easily distinguish the product from other products. Such labels may be printed by a printing machine on an appropriate printable face material attached via pressure sensitive adhesive on a liner which works as a backing material for the labels. Such liner may also be called as a release liner indicating that the pressure sensitive labels can be released from the liner at a labelling phase and attached with the products. Another possibility is a use of so called linerless labels where the printable face material is treated with an activatable adhesive which can be activated with heat, moisture or other means to become pressure sensitive just before the labelling phase. Linerless label material can be self-wound on roll without need of a separate removable liner to protect the adhesive layer. Yet a further possibility is the use of shrinkable filmic materials, where the shrinkable labels can be attached, for example, on a bottle by shrinking the label material formed as a sleeve or tube to remain on the labelled product without or minimal use of pressure sensitive adhesive.

The selection of the printable label face material as well as the label type in any of the above mentioned cases to be selected depends on, for example, ink used for the printing, material on which the labels will be attached with in the end use in question, label dispensing technique, desired visual appearance of the label and labelled product etc.

Conversion of the label material into printed individual labels ready to be dispensed on the labelled item involves several phases typically performed by different parties in different physical locations. A typical value chain might include, for example, label laminate manufacturer providing non-printed label material as customer rolls, printing house, printing brand and other information on the labels rolls, die cutter who die-cuts the printed face material into individual labels carried by the continuous liner ready for dispensing. These individual phases naturally differ in their details depending on the label type being pressure sensitive adhesive label (with liner), linerless label or shrinkable label. The main phases can be understood as printable label material manufacturing in high volumes and then the conversion of such label materials into printed individual labels on narrow customer rolls ready for dispensing. The latter conversion phase includes the printing of the labels as its subphase. Each of the aforementioned phases or subphases during the preparation of label may be performed by separate parties (typically in different locations) or it is also possible that a single party may perform all of the phases in a single location as an online process. All variations in between are also possible.

Beside the physical value chain preparing the physical labels there exists the brand related value chain being responsible for preparing the information and artwork to be printed on the labels. This involves creating and selecting the printable content as well as selection of the label material for suitable visual appearance as well as technical performance for the given end use. Later in this text the activities related to this brand related value chain and partly overlapping with the physical label preparation value chain are called "printing material management".

Today, most of the communication related to the printing material management is done manually using emails. The user sends over a printing file (artwork), information of the label size, material selection, roll direction and core size of a roll of labels in an email. This may take a lot of time and usually the file sizes of the artwork are quite large. Therefore, an email based method is not the best and secure way to deliver large, business critical information. There is also a lot of manual work at a printing house to upload all the needed information into a system of a printing machine managed by the printing house. When manufacturing smart labels, the digital content management is today also set-up manually which takes time. In all of these steps there is a risk of information loss, manual error or security breach. Further the trend in the future is to be able to print more customized and more individual labels which leads to the situation that the printable content changes often and leads to shorter and shorter printing runs based on the same printable content. The ultimate situation in this might lead to printing different content to each individual label.

In addition to basic brand image and basic product information, the package of the item in its label may also comprise a visual and machine readable, unique code (unique ID), such as a bar code or a so-called QR code (quick response code). The code itself may include some details of the product and/or may contain a link to a database from which more information about the product can be obtained. Hence, a consumer may capture an image of the code by a communication device such as a smart phone, wherein an application in the communication device interprets the image to find the code and to interpret it so that an address of the link embedded in the code can be revealed and information may be retrieved from the indicated address.

SUMMARY

One aim of the present invention is to solve the problem of printing material management utilizing two application programming interfaces and user identifications. This will streamline the communications between involved parties and make possible to economically and reliably manufacture labels in production runs where the information content on individual labels is more varying and individual.

In accordance with an embodiment, a printing material management system is a system which has a web-based user interface, cloud storage and one or more application programming interfaces (APIs). These application programming interfaces can be integrated with a digital printing machine and content management platforms. With the integrations, a user of the user interface is capable of adding information related to e.g. printing material artwork, dimensions, roll direction, core size and give needed information to choose the right printing material for the printing job. All the information can be uploaded to a temporary cloud storage from where it can be downloaded into a workflow of the printing machine.

Also the logistic delivery information and settings of the application programming interfaces can be setup using the printing material management system. Needed information is delivered to the content management platform and to the printing machine and/or other systems managing such content over the application programming interfaces.

When starting to use the printing material management system, the user may create a user account for her-/himself. With this account information, the system knows to which customer account in the printing house's system or in the content management system the given information belongs to. The user account can also hold secure API keys to the printing machine system and/or content management system to validate the right of the printing house to create unique IDs from the content management system.

Once the user has created the user account and the account is verified, the user can make printing requests directly from the user interface by downloading artwork and giving needed information of the printing job. Once the user has given all the needed information, the system will send over the information to the printing machine and to the content management platform over the application programming interfaces.

In accordance with an embodiment, there are at least two interfaces in which a user identification is utilized: one interface is related to physical properties of a printing job (paper quality, printing powder, selection of a printing machine, etc.) and another interface is related to provision of digital data (e.g. unique codes, artwork, etc.) for a printing job.

According to a first aspect there is provided a method for management of printing jobs, the method comprising:
requesting user identification;
selecting an artwork for the labels;
retrieving data regarding the selected artwork from a data storage;
defining printing properties for the selected artwork;
determining a set of available unique codes for the labels on the basis of the user identification;
constructing a printing file including information related to at least the following:
the selected artwork, and
printing material selected for the printing job,
wherein the method further comprises:
storing the printing file into a cloud storage linked with the identified user;
assigning a unique code for each label from the set of available unique codes;
wherein the unique code is assigned either in the printing file or when printing the labels.

According to a second aspect there is provided an apparatus for management of printing jobs comprising:
means for requesting user identification;
means for selecting an artwork for the labels;
means for retrieving data regarding the selected artwork from a data storage;
means for defining printing properties for the selected artwork;
means for determining a set of available unique codes for the labels on the basis of the user identification;
means for constructing a printing file including information related to at least the following:
the selected artwork, and
printing material selected for the printing job,
wherein the apparatus further comprises:
means for storing the printing file into a cloud storage linked with the identified user; and
means for assigning a unique code for each label from the set of available unique codes;
wherein the unique code is configured to be assigned either in the printing file or when printing the labels.

According to a third aspect there is provided an apparatus for management of printing jobs comprising a processor and a memory, said memory comprising computer code when executed by the processor cause an apparatus at least to perform:
request user identification;
select an artwork for the labels;
retrieve data regarding the selected artwork from a data storage;
define printing properties for the selected artwork;
determine a set of available unique codes for the labels on the basis of the user identification;
construct a printing file including information related to at least the following:
the selected artwork, and
printing material selected for the printing job,
wherein the memory further comprises computer code when executed by the processor cause an apparatus at least to perform:
store the printing file into a cloud storage linked with the identified user; and
assign a unique code for each label from the set of available unique codes;
wherein the unique code is configured to be assigned either in the printing file or when printing the labels.

According to a fourth aspect there is provided a computer program product for management of printing jobs comprising computer code when executed by a processor cause an apparatus at least to perform:
request user identification;
select an artwork for the labels;
retrieve data regarding the selected artwork from a data storage;
define printing properties for the selected artwork;
determine a set of available unique codes for the labels on the basis of the user identification;
construct a printing file including information related to at least the following:
the selected artwork, and
printing material selected for the printing job,
wherein the computer program product further comprises computer code when executed by the processor cause an apparatus at least to perform:
store the printing file into a cloud storage linked with the identified user; and
assign a unique code for each label from the set of available unique codes;
wherein the unique code is configured to be assigned either in the printing file or when printing the labels.

The printing material (artwork) files are usually quite large. In accordance with an embodiment, the system has a cloud storage where the printing material files can be uploaded and stored temporarily. The printing machine operator can choose when to download the printing material file and needed information on to the printing machine system to avoid any delay in the printing information delivery.

The application programming interfaces can be highly secured to protect the information which may make the system more secure than email based systems.

BRIEF DESCRIPTION OF THE DRAWINGS

In the following, several embodiments will be descried in more detail with reference to the appended drawings, in which.

DETAILED DESCRIPTION

Figure 1A:
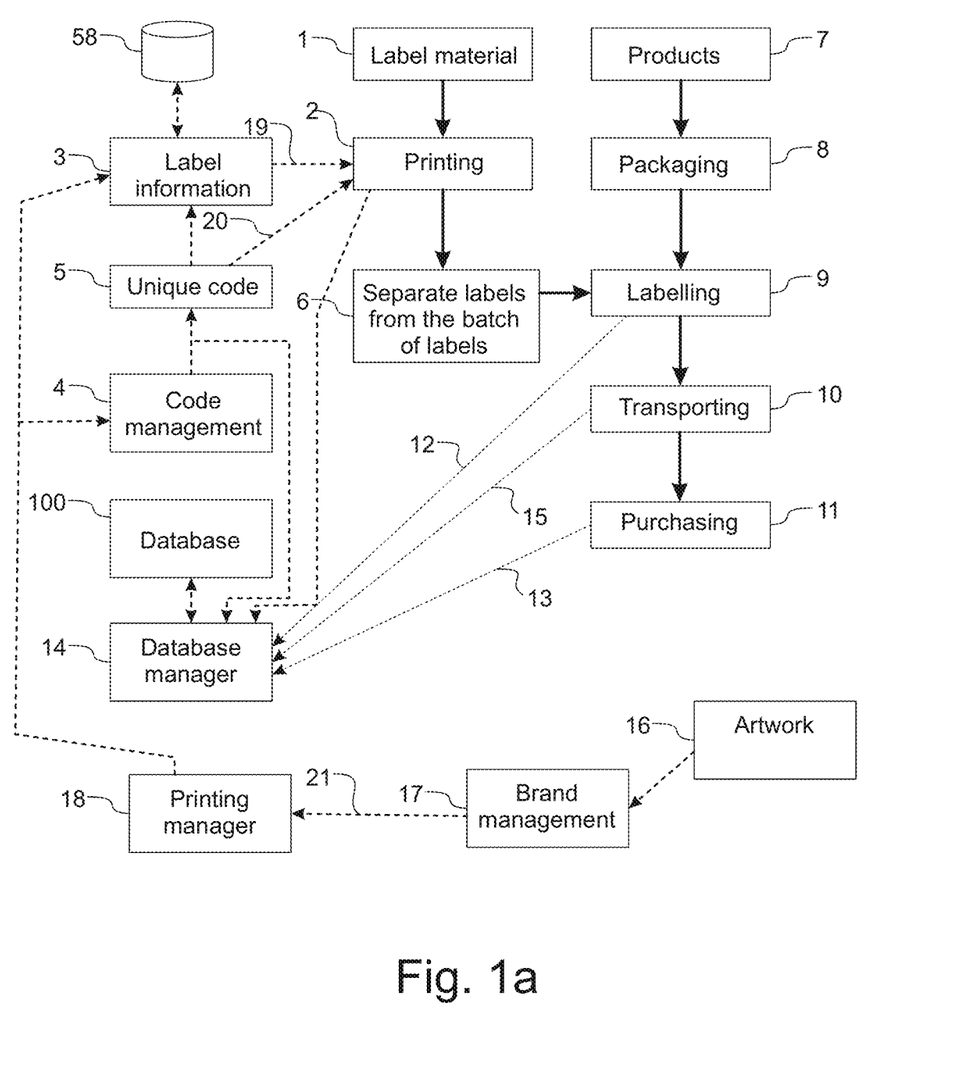
FIG. 1a illustrates an example of a process flow from label material selection, label preparation and printing to attachment to a product, in accordance with an embodiment.
Figure 2:
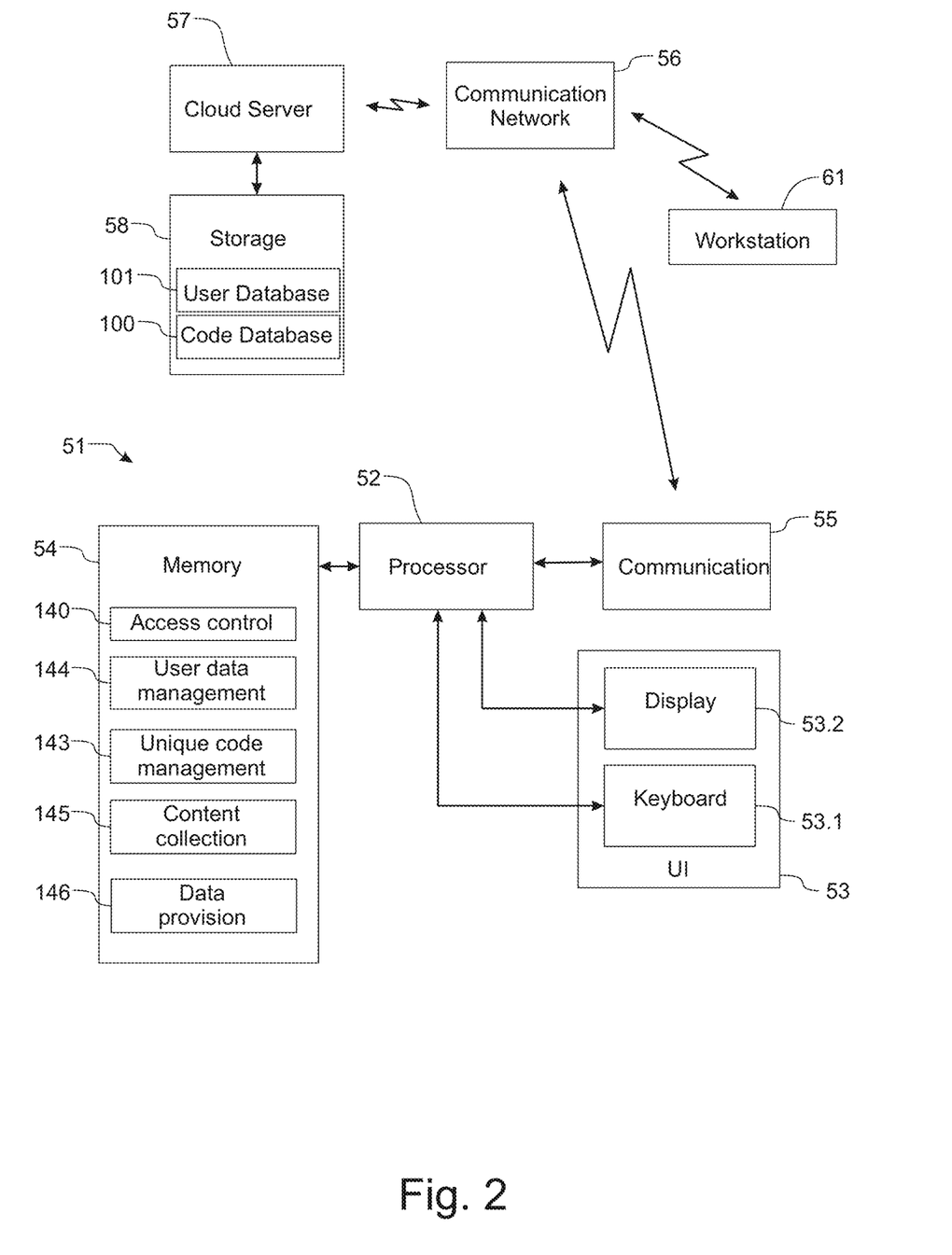
FIG. 2 illustrates an example of a digital printing management system as a simplified block diagram, in accordance with an embodiment.

FIG. 1a illustrates an example of a process flow from label material selection, label preparation and printing to attachment to a product and FIG. 2 illustrates an example of a digital printing material management system 50 as a simplified block diagram. In FIG. 1a solid lines illustrate flows of physical subject matter and dotted lines illustrate data flows.

Label material 1 is fed to a printing machine 2 for printing. The label material may have been selected so that it is appropriate for the product to which the label will be attached and also for the printing method and substances therein (e.g. printing technique incl. powder or ink and print curing method). The information may have been prepared and provided to the code management entity 4 by e.g. a brand owner 17, based on an artwork 16. The brand owner 17 may have sent the printing information to a printing management entity 18 which may have forwarded the information to the code management entity 4. The printing management entity 18 may also send the label information 3 to a cloud storage 58.

The printing machine 2 retrieves the information to be printed on the labels from the cloud storage 20 by a first application programming interface 19 and also fetches unique codes 5 for each label from a code management entity 4 by a second application programming interface 20.

Products 7 are also packaged 8 to a package suitable for the products. For example, liquid substances may be inserted into bottles or cartons.

After printing the labels are forwarded to for example a separation phase 6, where individual labels are separated (die-cut) from the label material by a cutting machine. The individual labels may then be attached with packages of the products by a labelling machine 9. When a label is attached with the package, information related to the product and the unique code is stored 12 to a database, which may be called as a code database 100. This may be implemented so that the labelling machine 9 reads the unique code from the label and sends this information to a database manager 14 in which the information of the unique code and information of the product of that particular package are linked together and stored into the code database 100.

In accordance with an embodiment, the code management entity 4 may have provided information of the generated/selected unique code when it was sent to be attached with a label. Hence, the code database 100 already comprises the unique code and the product information can be attached with the unique code in the code database 100 after the label have been attached to the product. In this embodiment it may be possible to check that the unique code attached with the product actually is a code provided by the code management entity 4.

Information of the product may vary depending on the nature of the product. The information may comprise an indication when the product was produced, indication of the machine which produced the product, the manufacturer of the product, nutrition details of the product, etc. The information may provide access to a further service not directly related to the product. Such service may be a video, game, lottery or something else used to promote the product for consumers and/or the reward the consumer of purchasing the product.

The above described examples of attachment of the unique code with the product are only non-limiting examples but also some other ways to attach a unique code with a product may be used.

The products having the unique code are delivered 10 to retail dealers, malls, warehouses or other locations for purchasing 11 by consumers. Information on the location may be provided 15 to the database manager 14 wherein the database manager 14 can link the product, unique code and the retail location together.

When the product have been purchased 11, information of the purchased product may be transmitted 13 to the database manager 14 so that it can update the database to include information that the product attached with the unique code has been purchased. The information may also include location where the product was purchased, indication of the purchaser, etc.

Figure 1B:
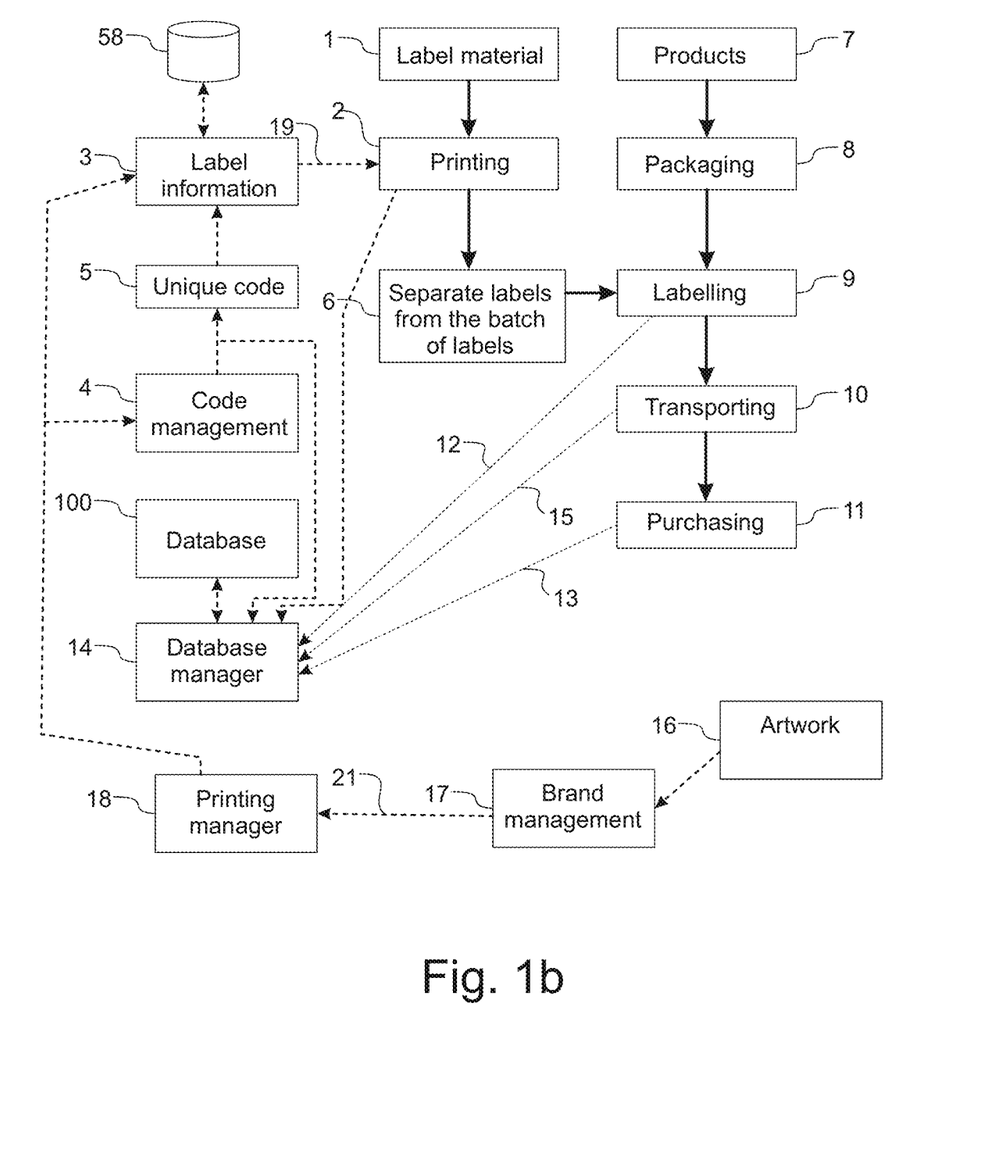
FIG. 1b illustrates an example of a process flow from label material selection, label preparation and printing to attachment to a product, in accordance with an embodiment.

FIG. 1b illustrates another example of a process flow from label material selection, label preparation and printing to attachment to a product. In this example the printing machine 2 has less control over the preparation of the labels but needs to receive more complete information for the printing of labels. One of the main differences with the embodiment of FIG. 1a is that the unique codes are already included in the printing file, which the printing machine 2 retrieves from the cloud storage 58 via the first application programming interface 19. Hence, the code management entity 4 provides information of the unique codes 5 for each label and stores the unique code information to the printing file in the cloud storage 58.

In the following, some details of the printing material management system 50 of FIG. 2 will be described. The printing material management system 50 of FIG. 2 has a control device 51, such as a computer, in which some operational elements for printing material management are provided. Such elements may be implemented as a computer code, using logic circuitry, a combination of computer code and logic circuitry, or by some other appropriate way. The control device 51 has, inter alia, a controller 52 (e.g. a processor), a user interface 53, which comprises at least input means 53.1 for inputting information to the printing material management system by management personnel of the printing material management system 50, and a display 53.2 for displaying information to the management personnel.

The control device 51 has also a memory 54 for storing computer code and information related to the operation of the printing management system 50. The control device 51 further has a communication interface 55 for sending information to a communication network 56 and for receiving information from the communication network 56.

The communication network 56 has a communication connection with at least some elements of the printing material management system 50, such as the control device 51, a code management entity 4, and a cloud server 57.

The cloud server 57 has a data storage 58 which can be used as a so-called cloud storage as will be described later in this specification.

The printing material management system 50 has also a user database 101, which may be located in the data storage 58 of the cloud server 57 or in the memory 54 of the control device 51 or in another appropriate place. The user database 101 has data records related to registered users. These data records may also be called as user accounts and each registered user has unique user account dedicated to her/him.

The code management entity 4 takes care of unique code preparation and bookkeeping of already used unique codes and information of the products to which the used unique codes have been assigned. Such information may be stored into a code database 100.

The unique code may be, for example, a bar code, a QR code, a Datamatrix code, a Digital Watermark or other visual code, or may be in another non-printable form which may not be visual but another kind of a machine readable code, such as a code encoded in an RFID tag (Radio Frequency Identification) or as an NFC (Near Field Communication) code or as a three-dimensional code, for example. The machine readable code may also be in a form of a combination of two or more different kinds of codes, such as a QR code implemented with an RFID tag. A non-limiting example of the three-dimensional code to be mentioned here is a 3D bar code having protrusions or colours as the third dimension. The visual code may also be called as a human recognizable code and the code which can be read by a device may be called as a machine readable code, which can be visual or non-visual. In accordance with an embodiment, the actual code may become visible or machine readable only in a certain lighting, such as in UV light or infrared light. For the purpose of this text the latter type of code is still considered to be a visual and/or machine readable code.

In accordance with an embodiment, the code management entity 4 may reserve certain ranges of unique codes for different users, wherein when a user requests unique codes for labels of products provided by the user, the code management entity 4 may select one unique code for each product from the range reserved for that particular user and send the codes to the printing machine 2.

The printing material management system 50 may also have a workstation 31 which a user, e.g. an employee of a brand owner, can use to define printing tasks. The workstation 31 has a controller 32 (FIG. 3), such as a computer, with which some operational elements for printing material management are provided. Such elements may be implemented as a computer code, using logic circuitry, a combination of computer code and logic circuitry, or by some other appropriate way. The workstation 31 has a user interface 33, which comprises at least input means 33.1 for inputting information to the printing material management system by a user, and a display 33.2 for displaying information to the user. The input means 33.1 may comprise a keyboard, a fingerprint sensor, a pointer device and/or some other appropriate input device, In addition or alternatively, the input means 33.1 may be implemented as a so-called touch screen, wherein a touch panel is attached above a display device.

Figure 3:
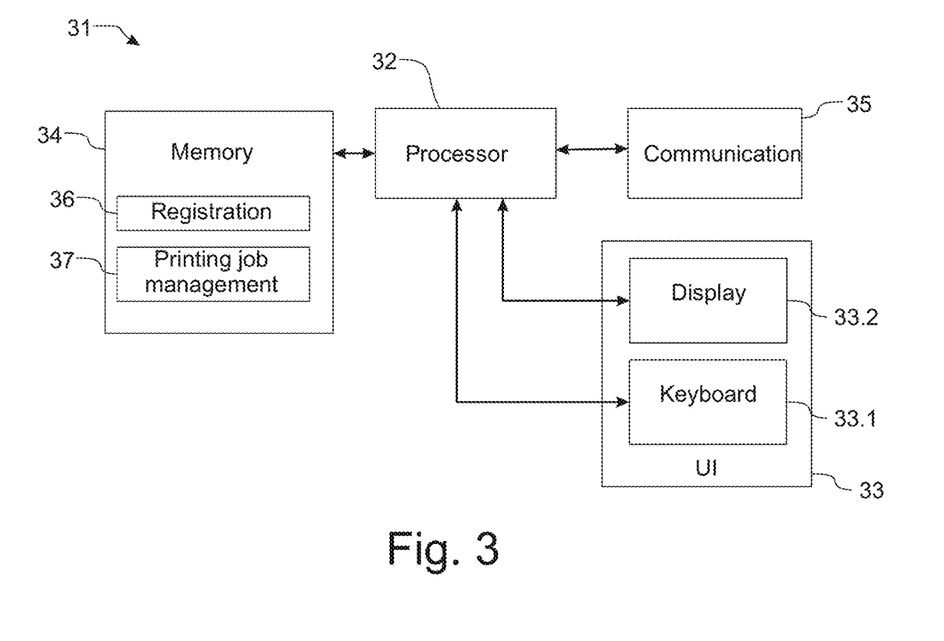
FIG. 3 shows an example of a workstation as a block diagram.

The workstation 31 has also a memory 34 for storing computer code and information related to the operation of the workstation 31. The workstation 31 further has a communication interface 35 for sending information to a communication network 56 and receiving information from the communication network 56. This kind of workstation 31 may be at a premises of a brand owner and is illustrated with the brand management block 17 in FIGS. 1*a* and 1*b*.

As a part of the printing material management system 50 there is also the printing manager 18 (FIGS. 1*a* and 1*b*). The printing manager 18 may keep record of registered users, brand owners etc. The printing manager 18 also prepares and sends information related to the printing job, which the user has entered by a printing job managing application 37, as will be described later.

When a user wishes to register her/himself as a user of the printing material management system 50 to create a so-called user account, s/he can start a corresponding application 36 by the controller 32 of the workstation 31. The application causes the controller 32 to display a registration form by the display 33.2. The user may then enter some user specific information (e.g. name, company, etc.) so that s/he can be distinguished from other users of the printing material management system 50. The user may also select a user ID and password to be used later when logging in to the printing material management system 50. Hence, the user database 101 may use the user ID as an index to the details of the user. The system 50 may also store information related to some kind of preferences of the user to the user database 101. The preferences may comprise information of rights of the user to print, information of unique codes assigned for that particular user etc. In this specification the user information stored for each registered user in the user database 101 can also be called as a data record containing user information, or shortly a user information record. Such a user information record may comprise several fields for storing different user related information e.g. the user ID, name, preferences etc.

With this user account information, the printing management system knows to which customer account in the printing house's system or in the content management system the given information belongs to. The user account can also hold secure API keys to the printing machine system and/or content management system to validate the right of the printing house to create unique IDs from the content management system.

The user data management may be performed by a user data management entity 144 in the printing material management system 50.

When a user wishes to log in to the printing material management system 50, the user may start the printing job managing application 37 by the workstation 31, which is able to communicate with the control device 51 to exchange information. The printing job managing application may comprise computer code for displaying a log-in window for entering user's credentials (user id, password) for example by a keyboard 33.1 of the workstation 31. The user credentials are delivered to the control device 51, in which e.g. an access control entity 140 uses the credentials and examines the user database 101 to find out whether the user database 101 has user information corresponding with the credentials entered by the user. If such information is found, the control device 51 retrieves information related to the user from the user database 101, i.e. the user information record, and sends it to the workstation 31. If user information is not found, the control device 51 may initiate a user registration procedure to register the user to the printing material management system 50. Hence, the user may enter her/his personal data by the workstation 31, which delivers the data to the printing material management system 50 as was described above.

Figure 5A:
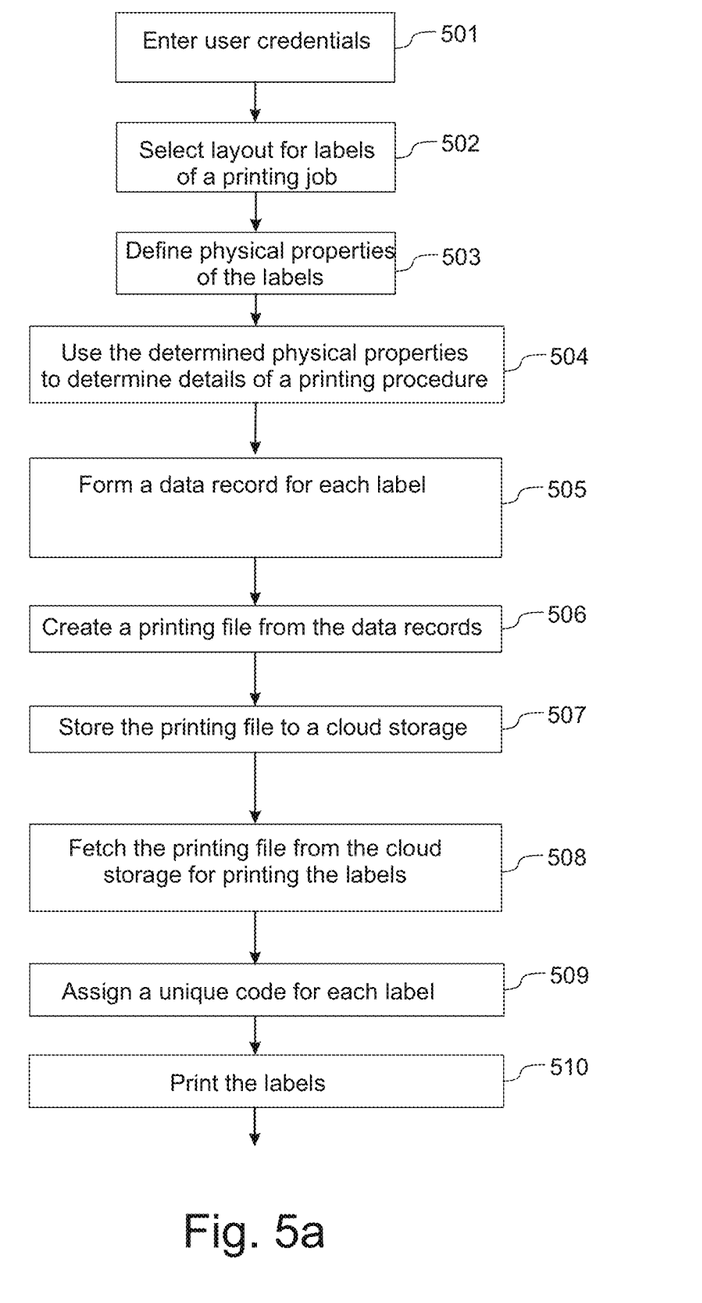
FIG. 5a is a flow diagram of a method, in accordance with an embodiment.

When a registered user of the printing material management system 50 is going to define a new printing task e.g. by using the workstation 31, the following operations may be performed, in accordance with an embodiment, as is illustrated in FIG. 5a. The workstation 31 executes the printing job managing application comprising computer code for requesting user's credentials (block 501 in FIG. 5a) to identify the user, and displaying a printing job management window. The printing job management window has several fields for defining different properties of the printing job. The printing job managing application may also cause the workstation 31 and the control device 51 to exchange information for retrieving from the user information record some user specific information (user preferences, if any) on the basis of user identification and fill in corresponding fields accordingly, wherein such prefilled data is displayed in the printing job management window. The user may change any of the prefilled fields unless modification of a field is prevented or restricted, and also fill other fields to determine details of the printing job.

A brand owner may have defined that only certain kind(s) of printing material are allowed to be used to print certain labels. Therefore, the user is restricted to select the printing material from those materials specified by the brand owner. Also one or more other properties of a printing job (e.g. quality of a printing powder, details of finishing printed labels, etc.) may have restrictions defined by e.g. a brand owner.

Figure 4:
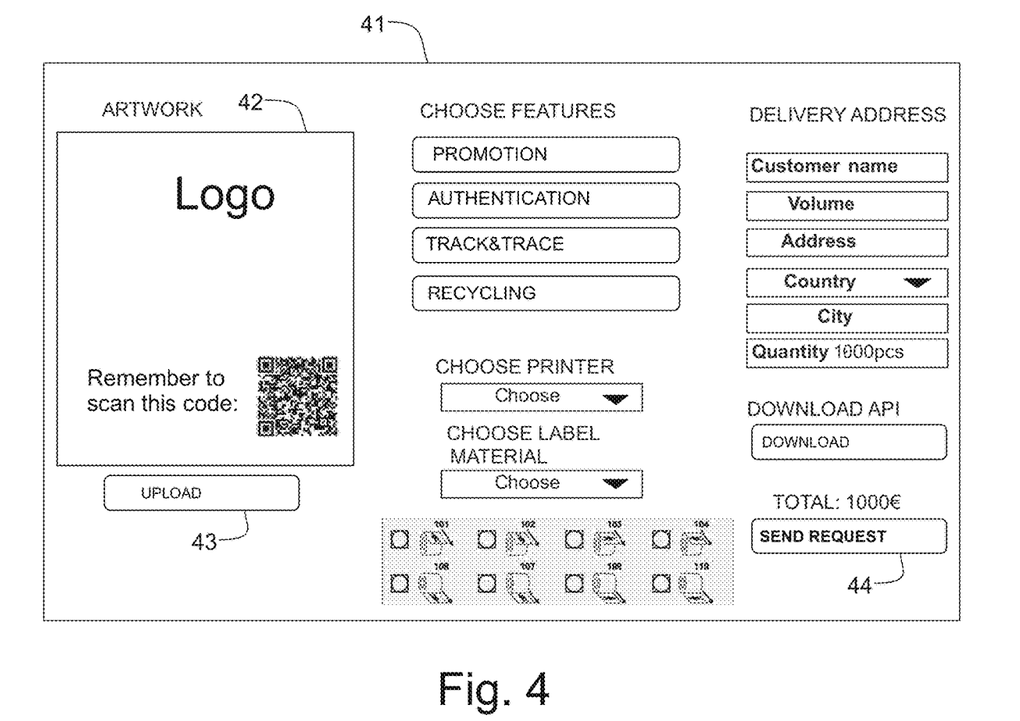
FIG. 4 illustrates an example of the printing job management window, in accordance with an embodiment.

FIG. 4 illustrates an example of the printing job management window 41 shown on the display 33.2 of the workstation 31. On the left there is a field 42 which the user can use to select 502 an artwork (layout) for the printing job. Different artworks may have been generated and stored into a cloud storage to be downloaded when needed. The user may not have right to access any of the stored artworks but the user information record may comprise information of artworks the user can or cannot have access. When the artwork 16 have been selected, the user may use a pointing device to point and select the Upload button 43 to download details of the artwork from the cloud storage 58 to the printing material management application. Then the user can modify the artwork if the user wishes to change it somehow and upload the modified artwork to the cloud storage 58 as a new version of the downloaded artwork or as a new artwork.

In the center of this example of the printing job management window 41 there are some fields which the user can use to define 503 several options, such as choose where to print (choose printer location), what material to use (choose label material), select a layout on the printing material, roll direction, core size etc.

On the right there are some fields which define details of the customer of the printing job, such as customer name, volume (e.g. the number of labels to print), delivery address, city and country of the customer, etc.

Some selections may affect available options of other fields. For example, if the user first selects the printing machine, selectable printing materials, roll directions, roll sizes etc. may be different compared to a situation in which another printing machine were selected. Information of details of, for example, printing machines and available options may be downloaded 504 from a control element of the printing machine, for example, or such information may be stored in another place of the printing material management system 50.

As an example, the selected printing machine may require that all printing job related data need to be provided as a printing file and the printing machine is not able to fetch any additional data for printing. On the other hand, some printing machines may have more sophisticated features which enable them to fetch some control data which need not be included in the printing file. As an example of such control data is the unique codes, which may or may not be included in the printing file. Therefore, the selection of the printing machine 2 may also define whether unique codes shall be included in the printing file or whether the unique codes shall be fetched by the printing machine 2.

When details for the printing job has been defined, the user may use a pointing device to point and select the Send request button 44 to initiate storage of information of the printing job. The printing job management application 37 of the workstation 31 can create a message on the basis of information of the printing job management window 41 and send the message to the printing material management system 50.

On the basis of the information contained in the message the printing material management system 50 may calculate the cost of the printing job and send this information to the workstation 31 to be displayed in the printing job management window 41.

When definitions for the printing job have been performed, information defined for the printing job will be transmitted to the printing material management system 50. This may be utilized by downloading a third application programming interface to the workstation 31 by selecting the Download API button. This means, for example, that the workstation 31 receives a software package which provides conversion instructions from the data entered via the printing job management window 41 to a format applicable for transmission to the printing management entity 18. In other words, the third application programming interface 21 may convert the user defined details of the printing job to a certain kind of a message which the printing management entity 18 is able to handle and process. Details of the printing job may be stored 507 in the cloud storage 58. The selection of the printing, machine 2 may also affect the selection of the third application programming interface. In other words, the selected third application programming interface is able to convert user defined data to a format appropriate for the selected printing machine 2.

In accordance with the embodiment of FIG. 1a and the flow diagram of FIG. 5a, a printing data file (also called as a printing file in this specification) is formed 506 by collecting 145 details of the printing job and arrange these details so that the printing file comprises one data record for each label to be printed 505. Each such data record comprises details of one label to be printed. The printing file may be provided 146 to the selected printing machine for printing.

The user ID of the definer of the printing job may also be used to determine which unique IDs are allowed to be provided to labels to be printed for that particular user. The user ID may be provided to the code management entity 4, which examines the range of unique codes allowed to be used 505 for that user to be printed on the labels of the printing job and assigns 509 a unique code from that range to each label of the printing job.

In the embodiment of FIG. 1a the unique code management entity 143 creates or fetches a unique code for each label and sends the unique codes to a selected printing machine via the second application programming interface 20 when the printing machine 2 requests such code(s). The printing machine 2 then examines the printing data file, fetches information from the data records, attaches the unique codes to the label information and prints the labels accordingly. Also the other phases of the label printing operation described above in the specification can be performed until the whole printing job has been performed.

Figure 5B:
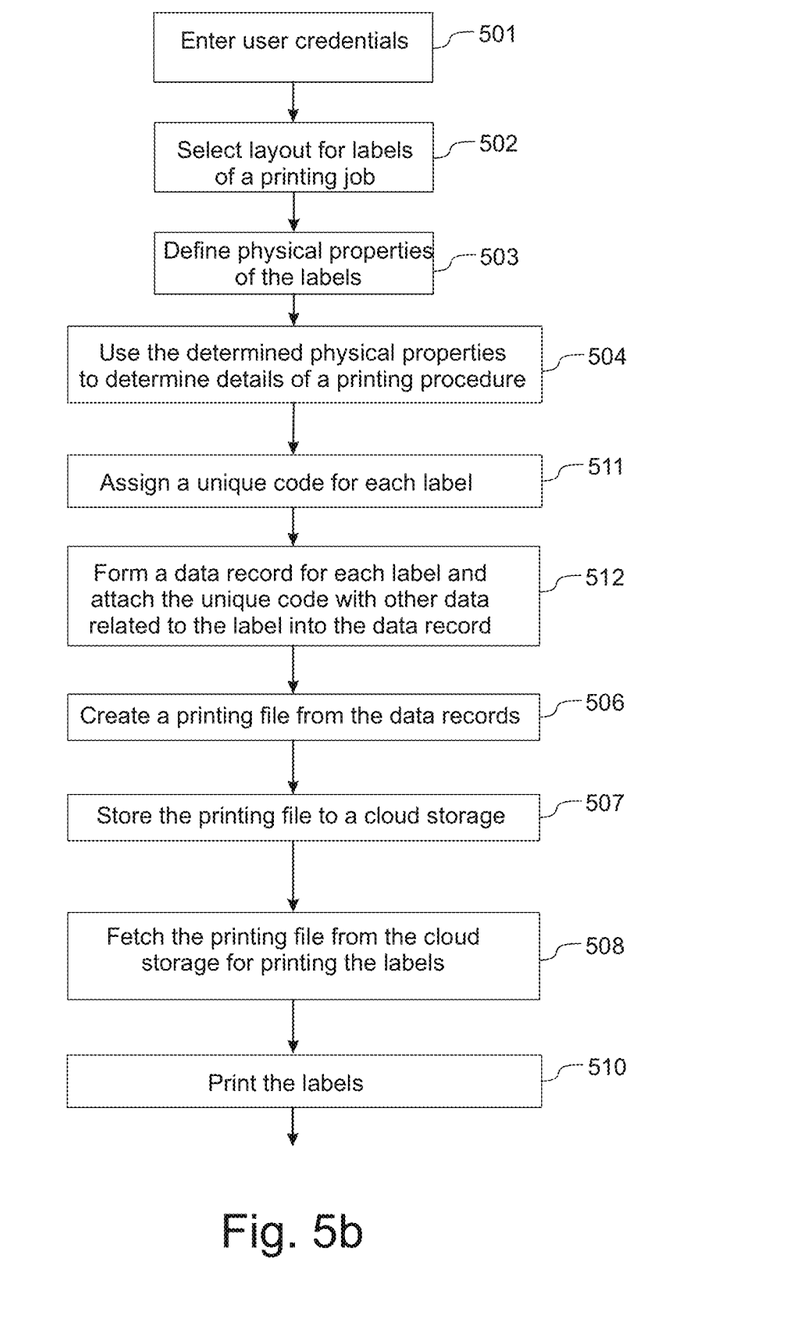
FIG. 5b is a flow diagram of a method, in accordance with another embodiment.

In accordance with the embodiment of FIG. 1*b* and the flow diagram of FIG. 5*b*, the unique code management entity 143 creates or fetches a unique code among those unique IDs which are allowed to be provided to labels to be printed for that particular user. The selected unique codes are assigned 511 for each label by including them in corresponding data records of labels in the printing file. In other words, the printing data file is formed 512 by collecting details of the printing job and arrange these details so that the printing file comprises one data record for each label to be printed. The printing file may be stored 507 to the cloud storage 58. The printing file may be fetched 508 later from the cloud storage or the printing file may be provided directly to the selected printing machine for printing 510 without temporarily storing the printing file to the cloud storage 58.

If the printing file is stored 507 to the cloud storage 58, the printing file is linked with the identified user in an appropriate manner. For example, a user id may be linked with the printing file so that when the printing machine 2 starts a printing job, the user id is requested or the user who controls the printing job by the printing machine 2, enters the user id or user credentials, wherein the printing machine 2 may send a request to a cloud server via the first application programming interface 19 and indicate the user id in the request. Then the cloud server may retrieve the printing file linked with the indicated user and send the printing file vial the first application programming interface 19 to the printing machine 2. The printing machine 2 can start printing the labels either when it has received enough information of the printing file or when it has received the whole printing file. Alternatively, the user of the printing machine 2 may control the start of the printing job by using some control equipment of the printing machine 2.

In accordance with an embodiment, the printing file includes information of at least the selected artwork and printing material selected for the printing job. However, also other information may be stored in the printing file and the information to be stored may also vary in different embodiments and with different printing machines.

In accordance with an embodiment, the digital data of the artwork is not stored into the printing file but information of an address of a storage location from where the digital data of the artwork can be downloaded by the printing machine when it is starting to perform the printing job.

The printing operation may not always follow immediately after defining details of the printing job but may be initiated later. Hence, the printing data file can be stored e.g. to the cloud storage 58 and fetched 508 from there when the printing job shall be started.

In addition to the details of the printing job, also logistic delivery information and settings of the application programming interfaces can be setup using the printing material management system. Such information may then be delivered to the content management platform and to the printing machine and/or other systems managing such content over the application programming interfaces.

On the basis of the above description it can be seen that printing job related information is delivered between different entities using at least partly application programming interfaces which take care of, for example, data conversion from one format to another format. No email transmission of printing job related information is needed, which makes the system more flexible and easier to use and faster than currently existing printing job management systems.

In the following some examples will be provided.

According to a first example there is provided a method for management of printing jobs, the method comprising:
  requesting user identification;
  selecting an artwork for the labels;
  retrieving data regarding the selected artwork from a data storage;
  defining printing properties for the selected artwork;
  determining a set of available unique codes for the labels on the basis of the user identification;
  constructing a printing file including information related to at least the following:
    the selected artwork, and
    printing material selected for the printing job, and
  wherein the method further comprises:
    storing the printing file into a cloud storage linked with the identified user;
    assigning a unique code for each label from the set of available unique codes;
    wherein the unique code is assigned either in the printing file or when printing the labels.

According to a second example there is provided an apparatus for management of printing jobs comprising:
  means for requesting user identification;
  means for selecting an artwork for the labels;
  means for retrieving data regarding the selected artwork from a data storage;
  means for defining printing properties for the selected artwork;
  means for determining a set of available unique codes for the labels on the basis of the user identification;
  means for constructing a printing file including information related to at least the following:
    the selected artwork, and
    printing material selected for the printing job,
  wherein the apparatus further comprises:
    means for storing the printing file into a cloud storage linked with the identified user; and
    means for assigning a unique code for each label from the set of available unique codes;
    wherein the unique code is configured to be assigned either in the printing file or when printing the labels.

According to a third example there is provided an apparatus for management of printing jobs comprising a processor and a memory, said memory comprising computer code when executed by the processor cause an apparatus at least to perform:
  request user identification;
  select an artwork for the labels;
  retrieve data regarding the selected artwork from a data storage;
  define printing properties for the selected artwork;
  determine a set of available unique codes for the labels on the basis of the user identification;
  construct a printing file including information related to at least the following:
    the selected artwork, and
    printing material selected for the printing job,
  wherein the memory further comprises computer code when executed by the processor cause an apparatus at least to perform:

store the printing file into a cloud storage linked with the identified user; and assign a unique code for each label from the set of available unique codes;

wherein the unique code is configured to be assigned either in the printing file or when printing the labels.

According to a fourth example there is provided a computer program product for management of printing jobs comprising computer code when executed by a processor cause an apparatus at least to perform:

request user identification;

select an artwork for the labels;

retrieve data regarding the selected artwork from a data storage;

define printing properties for the selected artwork;

determine a set of available unique codes for the labels on the basis of the user identification;

construct a printing file including information related to at least the following:
the selected artwork, and
printing material selected for the printing job, wherein the computer program product further comprises computer code when executed by the processor cause an apparatus at least to perform:

store the printing file into a cloud storage linked with the identified user; and assign a unique code for each label from the set of available unique codes;

wherein the unique code is configured to be assigned either in the printing file or when printing the labels.

According to a fifth example there is provided an apparatus for management of printing jobs comprising:

a user interface configured to request user identification and to select an artwork for labels;

a communication entity configured to retrieve data regarding the selected artwork from a data storage;

a printing job management entity configured to define printing properties for the selected artwork;

a code management entity configured to determine a set of available unique codes for the labels on the basis of the user identification;

a constructor configured to construct a printing file including information related to at least the following:
the selected artwork, and
printing material selected for the printing job, wherein the apparatus is further configured to:

assign a unique code for each label from the set of available unique codes;

wherein the unique code is configured to be assigned either in the printing file or when printing the labels;

wherein the communication entity is further configured to communicate the printing file into a cloud storage linked with the identified user.

According to a sixth example there is provided a system for management of printing jobs comprising:

one or more printing machines;

a code management entity;

a control device;

a cloud server;

a user database;

a workstation;

a user interface configured to request user identification and to select an artwork for the labels;

a communication entity configured to retrieve data regarding the selected artwork from a data storage;

a printing job management entity configured to define printing properties for the selected artwork;

a code management entity configured to determine a set of available unique codes for the labels on the basis of the user identification;

a constructor configured to construct a printing file including information related to at least the following:
the selected artwork, and
printing material selected for the printing job, wherein the system is further configured to:

assign a unique code for each label from the set of available unique codes;

wherein the unique code is configured to be assigned either in the printing file or when printing the labels;

wherein the communication entity is further configured to communicate the printing file into a cloud storage linked with the identified user.

The invention claimed is:

1. A method for management of printing jobs, the method comprising:

requesting user identification;

selecting an artwork for the labels;

retrieving data regarding the selected artwork from a data storage;

defining printing properties for the selected artwork;

determining a set of available unique codes for the labels on the basis of the user identification;

constructing a printing file including information related to at least the following:
the selected artwork, and
printing material selected for the printing job, wherein the method further comprises:

storing the printing file into a cloud storage linked with the identified user;

assigning a unique code for each label from the set of available unique codes;

wherein the unique code is assigned either in the printing file or when printing the labels.

2. The method according to claim 1 further comprising:
retrieving the printing file from the cloud storage; and
providing the printing file to a printing machine to initiate the printing job.

3. The method according to claim 1 further comprising:
using the user identification to determine artworks selectable for the user.

4. The method according to claim 1 further comprising:
including to the printing file a data record for each label; and
including each data record one unique code among the set of available unique codes.

5. The method according to claim 1 further comprising defining at least one of the following properties for the selected artwork:
selection of the printing machine;
material to be used;
layout on the printing material,
roll direction,
core size.

6. The method according to claim 5 further comprising:
using the defined at least one property to select an application programming interface;
downloading the selected application programming interface; and
using the downloaded application programming interface to convert details of the printing job to a format applicable to the selected printing machine.

7. An apparatus for management of printing jobs comprising:
- a user interface configured to request user identification and to select an artwork for labels;
- a first application programming interface configured to retrieve data regarding the selected artwork from a data storage;
- a printing job management window configured to define printing properties for the selected artwork;
- a code manager configured to determine a set of available unique codes for the labels on the basis of the user identification;
- a constructor configured to construct a printing file including information related to at least the following:
- the selected artwork, and
- printing material selected for the printing job, wherein the apparatus is further configured to:
- assign a unique code for each label from the set of available unique codes;
- wherein the unique code is configured to be assigned either in the printing file or when printing the labels;

wherein the first application programming interface is further configured to communicate the printing file into a cloud storage linked with the identified user.

8. The apparatus according to claim 7, characterized in that the apparatus is configured to:
- retrieve the printing file from the cloud storage; and
- provide the printing file to a printing machine to initiate the printing job.

9. The apparatus according to claim 7, characterized in that the apparatus is configured to use the user identification to determine artworks selectable for the user.

10. The apparatus according to claim 7, characterized in that the apparatus is configured to:
- include to the printing file a data record for each label; and
- include each data record one unique code among the set of available unique codes.

11. The apparatus according to claim 7, characterized in that the apparatus is configured to define at least one of the following properties for the selected artwork:
- selection of the printing machine;
- material to be used;
- layout on the printing material,
- roll direction,
- core size.

12. An apparatus for management of printing jobs comprising a processor and a memory, said memory comprising computer code when executed by the processor cause an apparatus at least to perform:
- request user identification;
- select an artwork for the labels;
- retrieve data regarding the selected artwork from a data storage;
- define printing properties for the selected artwork;
- determine a set of available unique codes for the labels on the basis of the user identification;
- construct a printing file including information related to at least the following:
- the selected artwork, and
- printing material selected for the printing job, wherein the memory further comprises computer code when executed by the processor cause an apparatus at least to perform:
- store the printing file into a cloud storage linked with the identified user; and
- assigning a unique code for each label from the set of available unique codes;
- wherein the unique code is configured to be assigned either in the printing file or when printing the labels.

13. A computer-implemented method for digital content management and sharing, the method comprising:
- requesting user identification;
- selecting an artwork for the labels;
- retrieving data regarding the selected artwork from a data storage;
- defining printing properties for the selected artwork;
- determining a set of available unique codes for the labels on the basis of the user identification;
- constructing a printing file including information related to at least the following:
- the selected artwork, and
- printing material selected for the printing job,
- storing the printing file into a cloud storage linked with the identified user; and
- assigning a unique code for each label from the set of available unique codes;
- wherein the unique code is configured to be assigned either in the printing file or when printing the labels.

14. A system for management of printing jobs comprising:
- one or more printing machines;
- a code manager;
- a control device;
- a cloud server;
- a user database;
- a workstation;
- a user interface configured to request user identification and to select an artwork for the labels;
- a first application programming interface configured to retrieve data regarding the selected artwork from a data storage;
- a printing job management window configured to define printing properties for the selected artwork;
- a code manager configured to determine a set of available unique codes for the labels on the basis of the user identification;
- a constructor configured to construct a printing file including information related to at least the following:
- the selected artwork, and
- printing material selected for the printing job, wherein the system is further configured to:
- assign a unique code for each label from the set of available unique codes;
- wherein the unique code is configured to be assigned either in the printing file or when printing the labels;
- wherein the first application programming interface is further configured to communicate the printing file into a cloud storage linked with the identified user.

15. A method for management of printing jobs, the method comprising:
- requesting user identification;
- selecting an artwork for the labels;
- retrieving data regarding the selected artwork from a data storage;
- defining printing properties for the selected artwork;
- determining a set of available unique codes for the labels on the basis of the user identification;
- constructing a printing file including information related to at least the following:
- the selected artwork, and
- printing material selected for the printing job, wherein the method further comprises:
- storing the printing file into a cloud storage linked with the identified user;

assigning a unique code for each label from the set of available unique codes; and marking the assigned unique code as an already used code;

wherein the unique code is assigned either in the printing file or when printing the labels.

\* \* \* \* \*